United States Patent [19]

Troster

[11] 3,888,863
[45] June 10, 1975

[54] BENZOXANTHENE AND BENZOTHIOXANTHENE DYESTUFFS AND PROCESS FOR THEIR MANUFACTURE

[75] Inventor: Helmut Troster, Frankfurt am Main, Germany

[73] Assignee: Hoechst Aktiengesellschaft, Frankfurt am Main, Germany

[22] Filed: Jan. 2, 1973

[21] Appl. No.: 320,578

Related U.S. Application Data

[62] Division of Ser. No. 133,351, April 12, 1971, Pat. No. 3,759,953.

[30] Foreign Application Priority Data

Apr. 14, 1970  Germany............................ 2017764

[52] U.S. Cl. .............................................. 260/281
[51] Int. Cl............................................. C07d 39/00
[58] Field of Search............................ 260/281, 282

[56]  References Cited
UNITED STATES PATENTS

| | | | |
|---|---|---|---|
| 1,886,797 | 11/1932 | Eckert | 260/281 |
| 1,984,110 | 12/1934 | Bodmer | 260/281 |
| 2,914,531 | 11/1959 | Staeuble | 260/281 |
| 3,171,843 | 3/1965 | Weissauer | 260/281 |
| 3,310,564 | 3/1967 | Kasai | 260/281 |
| 3,322,769 | 5/1967 | Fuchs et al. | 260/282 |
| 3,330,834 | 7/1967 | Senshu | 260/281 |
| 3,349,727 | 7/1973 | Fuchs et al. | 260/281 |
| 3,357,985 | 12/1967 | Fuchs et al. | 260/281 |
| 3,367,937 | 2/1968 | Fuchs et al. | 260/281 |
| 3,376,303 | 4/1968 | Fuchs et al. | 260/281 |
| 3,515,732 | 6/1970 | Staeuble et al. | 260/281 X |
| 3,684,729 | 8/1972 | Tuite | 260/281 |
| 3,741,971 | 6/1973 | Fuchs et al. | 260/281 |
| 3,748,330 | 7/1973 | Fuchs et al. | 260/281 |

*Primary Examiner*—Donald G. Daus
*Attorney, Agent, or Firm*—Curtis, Morris & Safford

[57] ABSTRACT

Valuable benzoxanthene and benzothioxanthene dyestuffs of the general formula

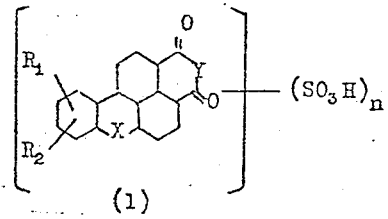

in which X represents an oxygen or sulfur atom, Y represents $$a \diagup\!\!\!\!\diagdown N-R$$

groups, wherein R stands for a hydrogen atom or an alkyl, cycloalkyl or aryl group which may be substituted, a heterocyclic radical, a hydroxyl or amino group, $R_1$ and $R_2$ each represent hydrogen atoms, halogen atoms, especially chlorine or bromine atoms, alkyl or alkoxy groups, and $n$ stands for a number of 1 to 3, which dyestuffs are suitable for dyeing and printing of plastic materials and excellently suitable as fluorescing dyestuffs in the dyeing of condensation resins which when dyed are distinguished by excellent fastness to bleeding and good fastness to light.

7 Claims, No Drawings

BENZOXANTHENE AND BENZOTHIOXANTHENE DYESTUFFS AND PROCESS FOR THEIR MANUFACTURE

This application is a divisional application of applicant's copending application Ser. No. 133,351 filed Apr. 12, 1971, and which issued on Sep. 18, 1973 as U.S. Pat. No. 3,759,953. Priority for the divisional application is based on German application Ser. No. P 20 17 764.4 filed Apr. 14, 1970 and is claimed in the parent application and a certified copy of the German application was filed therein on Oct. 20, 1972.

The present invention relates to new valuable benzoxanthene and benzothioxanthene dyestuffs of the general formula

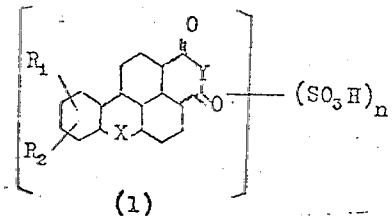

in which X represents an oxygen or sulfur atom, Y represents an oxygen atom or a

group, wherein R stands for a hydrogen atom or an alkyl, cycloalkyl or aryl group which may be substituted, a heterocyclic radical, a hydroxyl or amino group, $R_1$ and $R_2$ each represent hydrogen atoms, halogen atoms, especially chlorine or bromine atoms, alkyl or alkoxy groups, and $n$ stands for a number of 1 to 3.

The invention furthermore relates to a process for the manufacture of the above-specified compounds, wherein benzoxanthene or benzothioxanthene-3,4-dicarboxylic acid derivatives of the general formula

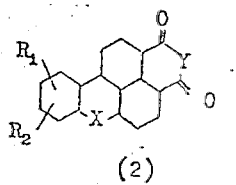

in which X, Y, $R_1$ and $R_2$ have the meanings given above, are sulfonated.

The sulfonation may be effected, for example, by treating the compound of formula (2) with concentrated or fuming sulfuric acid at room temperature or at an elevated temperature, the degree of sulfonation being determined by the temperature used, the concentration of the sulfuric acid used and by the reaction time. It is suitable to effect the sulfonation at temperatures in the range of from about 50° to about 170° C using a 95 percent or fuming sulfuric acid having a $SO_3$ content of up to about 20 percent.

The anhydrides or imides of formula (2) used as starting compounds may be obtained according to the process described in German Patent 1,297,259 and French Patent Specification 1,590,506 by heating in the presence of copper or copper salts the diazonium salts of compounds of the formula

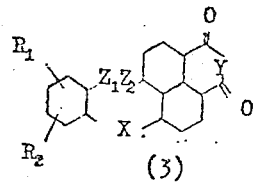

in which X, Y, $R_1$ and $R_2$ have the meanings given above, $Z_1$ represents a hydrogen atom and $Z_2$ represents an amino group, or $Z_1$ represents an amino group and $Z_2$ represents a hydrogen atom.

The dyestuffs of the present invention are excellently suited as fluorescing dyestuffs in the dyeing of condensation resins to which they impart luminous greenish yellow to orange yellow shades. The dyeings produced with these dyestuffs are distinguished by excellent fastness to bleeding and good to very good fastness to light. In addition, they are also suitable for the dyeing and printing of plastic materials, for example of polyamides.

The following Examples illustrate the invention:

EXAMPLE 1

28.8 g of benzoxanthene-3,4-dicarboxylic acid anhydride were introduced portionwise into 120 g of fuming sulfuric acid (20 percent $SO_3$ content). The temperature of the reaction mixture thereby rose to 70° C. The temperature was then raised within 30 minutes to 100° C and maintained for 30 minutes. After cooling, the sulfonation mixture was poured onto 130 g of ice. After a short time, the luminous yellow sulfonation product of the formula

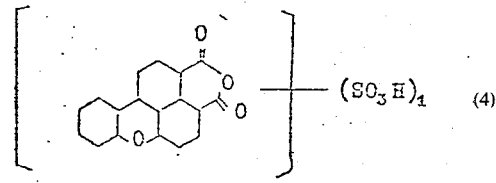

started to crystallize from the clear solution. It was filtered off with suction, washed with 50 percent sulfuric acid, then with concentrated hydrochloric acid and dried. The dyestuff was found to dye condensation resins, for example those on the basis of toluenesulfonamide-melamine-formaldehyde, outstandingly light and bleeding-fast, green fluorescent yellow-green shades.

Instead of the above-mentioned anhydride, the corresponding 9,10-dimethyl-, 10-bromo-, 9-chloro-, 9- or 10-methoxy- and the 9-chloro-10-methyl derivative can also be used with a similar result.

EXAMPLE 2

The sulfonation according to Example 1 was repeated, with the exception that the sulfonation mixture was stirred for 6 hours at 125°–130° C. The dyestuff of the formula

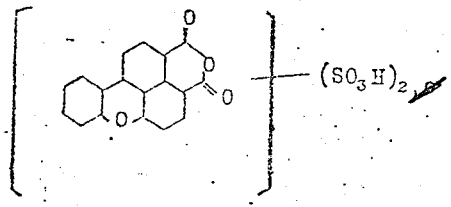

EXAMPLE 3

16.6 g of 10-methoxy-benzoxanthene-3,4-dicarboxylic acid hydrazide were introduced in the manner described in Example 1 into 120 g of fuming sulfuric acid (20 percent $SO_3$ content) and the whole was stirred for 3 hours at 100°–110° C. After the usual working up, there was obtained the dyestuff of the formula

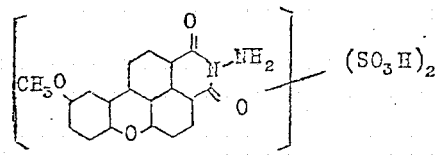

It was found to dye condensation resins, for example toluene-sulfonamide-urea-formaldehyde resins, luminous greenish yellow shades having very good fastness properties.

EXAMPLE 4

A mixture of 15.0 g of 9-methylbenzoxanthene-3,4-dicarboxylic acid-N-2',4'-dimethylphenylimide and 150 g of 95 percent sulfuric acid were kept for 2 hours at 80° C. After the usual working up, there was obtained the dyestuff of the formula

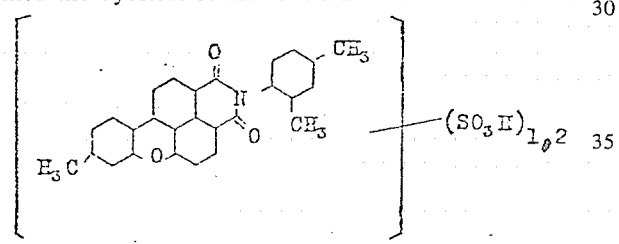

which dissolved in water gave an intensively green fluorescent solution.

EXAMPLE 5

40.7 g of benzothioxanthene-3,4-dicarboxylic acid-N-2',4'-dimethylphenylimide were introduced in small portions at 60°–70° C into 120 g of 20 percent oleum and the whole was then stirred for 3 hours at 110°–115° C. 130 ml of water were then added dropwise at room temperature and the orange sulfonic acid of the formula

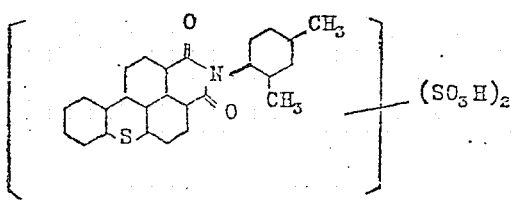

was isolated in known manner. It was crystallized from a mixture of glacial acetic acid and concentrated hydrochloric acid in the form of orange-colored small needles which were found to dissolve in water to give an intensively yellow green fluorescence solution. Condensation resins could be dyed with this dyestuff luminous orange-yellow shades which showed good fastness to light and very good fastness to bleeding.

The following Table shows other yellow green to orange yellow dyestuffs which can be obtained according to the methods described in the Examples.

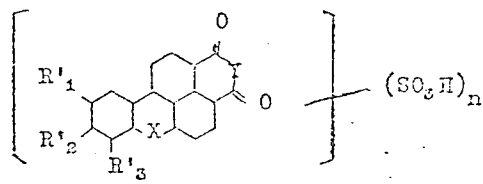

| Example | X | Y | $R'_1$ | $R'_2$ | $R'_3$ | n | Sulfonation according to Example |
|---|---|---|---|---|---|---|---|
| 6 | O | >NH | $CH_3$ | H | H | 1.6 | 1 |
| 7 | O | >N($CH_2$)$_3$$CH_3$ | H | H | H | 1.9 | 3 |
| 8 | O | >N—⟨⟩ | H | Cl | H | 2.8 | 2 |
| 9 | O | >N—⟨⟩—$CH_3$ | $CH_3$ | $CH_3$ | H | 2.7 | 2 |
| 10 | O | >N—($CH_2$)$_3$O—⟨N⟩ | H | H | H | 1.1 | 4 |
| 11 | O | >N—($CH_2$)$_3$O$CH_3$ | $OCH_3$ | H | H | 1.2 | 4 |
| 12 | O | >N—$CH_3$ | Br | H | H | 1.7 | 3 |
| 13 | O | O | H | H | $CH_3$ | 1.4 | 1 |

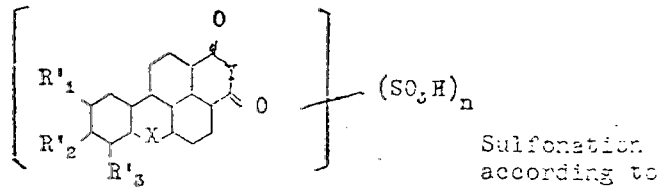

| Example | X | Y | $R_1'$ | $R_2'$ | $R_3'$ | n | Sulfonation according to Example |
|---|---|---|---|---|---|---|---|
| 14 | O | O | $OCH_3$ | H | H | 1.9 | 3 |
| 15 | S | O | H | H | H | 1.5 | 1 |
| 16 | S | O | $CH_3$ | $CH_3$ | H | 1.3 | 1 |
| 17 | S | >N—◯ | | H | H | H | 2.6 | 2 |
| 18 | S | >N—◯—Cl | H | Cl | H | 2.2 | 5 |
| 19 | S | >N—H | H | H | H | 1.7 | 3 |
| 20 | S | >N—$CH_3$ | H | H | H | 1.6 | 3 |

We claim:

1. A dyestuff of the formula

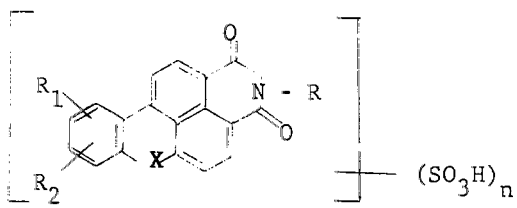

wherein X is oxygen or sulfur, R is hydrogen, amino, lower alkyl, cyclohexoxy lower alkyl, lower alkoxy-lower alkyl, phenyl, chlorophenyl, lower alkyl phenyl, di-lower alkyl phenyl, $R_1$ and $R_2$ each is hydrogen, chlorine, bromine, lower alkyl or lower alkoxy, and $n$ is a value from 1 to 3.

2. A dyestuff according to claim 1 wherein
X is oxygen,
R is $-NH_2$,
$R_1$ is methoxy para to X,
$R_2$ is hydrogen, and
$n$ is 2.

3. A dyestuff according to claim 1 wherein
X is sulfur,
R is 2,4-dimethylphenyl,
$R_1$ and $R_2$ each is hydrogen, and
$n$ is 2.

4. A dyestuff according to claim 1 wherein
X is oxygen,
R is n-butyl,
$R_1$ and $R_2$ each is hydrogen, and
$n$ is 1.9.

5. A dyestuff according to claim 1 wherein
X is oxygen,
R is 3-methoxy-n-propyl,
$R_1$ is methoxy para to X,
$R_2$ is hydrogen, and
$n$ is 1.2.

6. A dyestuff according to claim 1 wherein
X is sulfur,
R, $R_1$ and $R_2$ each is hydrogen, and
$n$ is 1.7.

7. A dyestuff according to claim 1 wherein
X is sulfur,
R is methyl,
$R_1$ and $R_2$ each is hydrogen, and
$n$ is 1.6.

* * * * *